United States Patent [19]
Sweeney et al.

[11] Patent Number: 5,931,189
[45] Date of Patent: Aug. 3, 1999

[54] ONE WAY VALVE FOR USE WITH VACUUM CLEANER ATTACHMENT

[75] Inventors: Gerald W. Sweeney, Atherton; James W. Pfeiffer, Los Gatos; Howard R. Mullin, Atherton, all of Calif.

[73] Assignee: New West Products, Inc., Redwood City, Calif.

[21] Appl. No.: 08/851,361

[22] Filed: May 5, 1997

Related U.S. Application Data

[60] Continuation of application No. 08/423,761, Apr. 17, 1995, abandoned, which is a division of application No. 08/168,963, Dec. 15, 1993, Pat. No. 5,480,030.

[51] Int. Cl.$^6$ ............................ F16K 15/14; B65D 81/20
[52] U.S. Cl. .................... 137/512.15; 137/854; 141/65; 206/524.8; 383/103
[58] Field of Search ................ 137/512.15, 854; 141/65; 383/100, 103; 206/524.8

[56] References Cited

U.S. PATENT DOCUMENTS

| | | | |
|---|---|---|---|
| 2,821,338 | 1/1958 | Metzger | 141/65 X |
| 2,913,030 | 11/1959 | Fisher | 150/52 |
| 3,060,985 | 10/1962 | Vance et al. | 150/3 |
| 3,135,411 | 6/1964 | Osborne | 141/65 X |
| 3,141,221 | 7/1964 | Faulls, Jr. | 24/30.5 |
| 3,313,444 | 4/1967 | Katell | 141/65 X |
| 3,351,270 | 11/1967 | Hohnjec | 229/44 |
| 3,403,696 | 10/1968 | Pynchon | 137/516.13 |
| 3,454,182 | 7/1969 | Morton | 220/44 |
| 3,574,306 | 4/1971 | Alden | 128/214.4 |
| 3,831,628 | 8/1974 | Kintner et al. | 137/512.15 |
| 3,911,949 | 10/1975 | Hilden et al. | 137/854 |
| 3,958,693 | 5/1976 | Greene | 206/455 |
| 4,082,201 | 4/1978 | Bittel | 220/339 |
| 4,209,485 | 6/1980 | Greenspan | 265/242 |
| 4,212,337 | 7/1980 | Kamp | 150/3 |
| 4,372,921 | 2/1983 | Sanderson et al. | 422/300 |
| 4,486,923 | 12/1984 | Briggs | 24/30.5 R |
| 4,712,574 | 12/1987 | Perrott | 137/217 |
| 4,747,702 | 5/1988 | Scheibner | 383/63 |
| 4,778,282 | 10/1988 | Borchardt et al. | 383/63 |
| 4,786,285 | 11/1988 | Jambor | 604/342 |
| 4,812,056 | 3/1989 | Zieke | 383/65 |
| 4,871,264 | 10/1989 | Robbins et al. | 383/68 |
| 4,892,414 | 1/1990 | Ausnit | 383/63 |
| 4,917,506 | 4/1990 | Scheibner | 383/63 |

(List continued on next page.)

FOREIGN PATENT DOCUMENTS

| | | | |
|---|---|---|---|
| 3917344 A1 | 11/1990 | Germany | 206/524.8 |
| 4-36940 | 6/1992 | Japan | B65D 33/01 |
| 404189752 | 7/1992 | Japan | 206/524.8 |
| 4189752 | 7/1992 | Japan | B65D 33/01 |
| 4242544 | 8/1992 | Japan | B65D 33/01 |

OTHER PUBLICATIONS

Copy of Packaging of Vacuum Shringk Depositing Bags for Cotton Products from Beijing J2 Jia Li New Technology Developing Co.

*Primary Examiner*—John Rivell
*Attorney, Agent, or Firm*—Skjerven, Morrill, MacPherson, Franklin & Freil LLP; David E. Steuber

[57] ABSTRACT

A reusable, evacuable enclosure comprising a bag with an opening in which to place compressible articles, such as clothing or linen, and a one-way valve in a surface of the bag. Compressible articles may be placed in the bag and sealed from the surrounding environment by placing a seal across the opening. The excess air in the bag may then be removed by placing a cylindrical attachment of a household vacuum cleaner over the one-way valve. Once the excess air is extracted, a cap is placed over the valve to ensure a permanent seal. Removal of excess air reduces the size of the compressible article and inhibits the growth of insects and bacteria, which may damage the contents of the bag. Moreover, the enclosure is impervious to moisture, and so inhibits the growth of mildew.

8 Claims, 7 Drawing Sheets

U.S. PATENT DOCUMENTS

| | | | |
|---|---|---|---|
| 5,063,639 | 11/1991 | Boeckmann et al. | 24/30.5 R |
| 5,067,822 | 11/1991 | Wirth | 383/61 |
| 5,080,155 | 1/1992 | Crozier | 150/154 |
| 5,121,590 | 6/1992 | Scanlon | 141/65 X |
| 5,142,970 | 9/1992 | ErkenBrack | 99/472 |
| 5,203,458 | 4/1993 | Cornwell | 206/524.8 |
| 5,242,516 | 9/1993 | Custer et al. | 383/63 |
| 5,282,322 | 2/1994 | Kasuya | 34/93 |
| 5,368,394 | 11/1994 | Scott et al. | 383/63 |
| 5,371,925 | 12/1994 | Sawatsky | 24/30.5 R |
| 5,397,182 | 3/1995 | Gaible et al. | 383/63 |

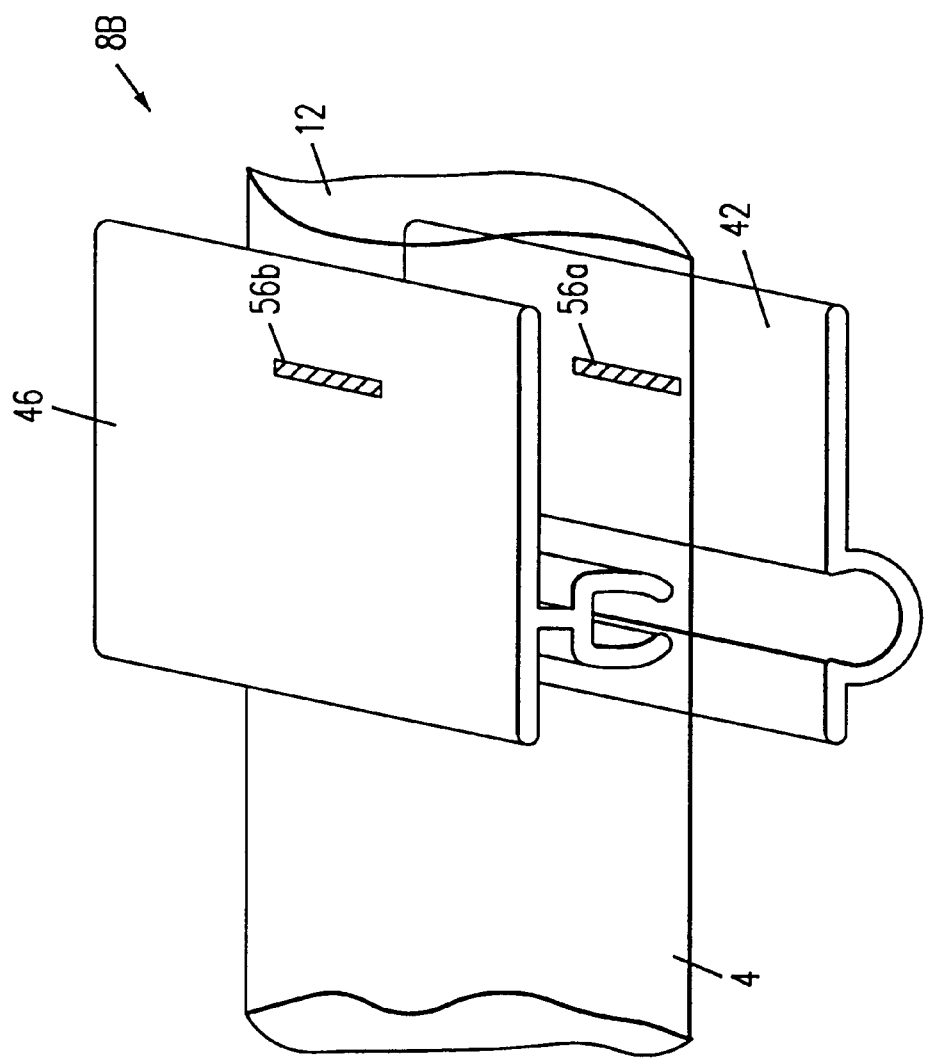

ONE WAY VALVE FOR USE WITH VACUUM CLEANER ATTACHMENT

This application is a continuation of application Ser. No. 08/423,761, filed Apr. 17, 1995 now abandoned, which is a division of application Ser. No. 08/168,963, filed Dec. 15, 1993, now U.S. Pat. No. 5,480,030.

FIELD OF THE INVENTION

The present invention relates to collapsible containers for storing compressible articles, such as linen and clothing, and in particular to evacuable storage containers.

BACKGROUND

Collapsible, evacuable storage containers typically include a flexible, air-tight bag, an opening through which to place an article in the bag, and a fixture through which to evacuate excess air. A user places an article into the enclosure through the opening, seals the opening, and then evacuates the air through the fixture. With the chamber thus evacuated, the article contained therein may be significantly compressed, so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

One such container was developed by James T. Cornwell (U.S. Pat. No. 5,203,458). That patent described a disposable, evacuable container for sealing and compressing contaminated surgical garments for ease of storage and transportation prior to disposal. That device requires a special vacuum source to evacuate the container and a heat source to provide an air-tight seal across the opening, and is designed to be used only once before it is discarded.

Another such enclosure is described in a patent to Akihiro Mori and Ichiro Miyawaki (Japanese Pat. No. 1767786). In that device, the opening through which the stored article is placed requires the application of a heat source, such as a home iron, to form an effective seal. Because the resulting seal is permanent, the sealed portion of the container must be cut away each time the container is opened, resulting in a waste of material, a container whose volume decreases with each use, and a limit on the number of times the container may be reused. Moreover, the use of a heat source to seal the container may be hazardous, and increases the complexity and difficulty of providing a seal.

For the forgoing reasons, there is a need for a reusable, evacuable storage container that does not require a heat source to seal effectively and may be evacuated using a common household vacuum cleaner.

SUMMARY

The present invention is directed to a reusable, evacuable storage container that may be evacuated using a common household vacuum cleaner. A polyethylene bag forms the body of the container. The bag includes a hole, in which is inserted a one-way valve, and an opening through which to insert articles for storage, especially compressible articles such as clothing. A reusable seal is provided to pinch the opening of the bag closed, and thereby provide an air-tight seal.

The one-way valve inserted in the bag allows air to flow out of the bag and prevents air from flowing into the bag. The body of the valve is equipped with an O-ring that provides a tight seal between a cylindrical vacuum attachment and the valve body. A valve cap is provided to ensure an air-tight seal between the inside of the bag and the ambient environment after the bag is evacuated.

To store and preserve an article in a vacuum storage container in accordance with the present invention, a user places the article through the opening in the bag, and uses a hinged seal to seal the opening. Next, using any suitable vacuum source (including most household vacuum cleaners), the user places a cylindrical vacuum attachment against the O-ring in the valve body, turns on the vacuum source, and thereby extracts the excess air from the bag. If the article to be stored is compressible, such as linen or clothing, removal of the excess air greatly reduces the volume of the articles.

Once the excess air has been extracted, the vacuum attachment may be removed. Without the vacuum source applied to the valve body, the one-way valve closes due to the pressure differential between the outside and the inside of the bag. The user then replaces the valve cap to ensure the integrity of the seal, and is so doing forces the one-way valve against the valve seat, ensuring the integrity of the valve seal. With the contents of the bag thus sealed from the surrounding environment, the bag may be stored or shipped.

BRIEF DESCRIPTION OF THE DRAWINGS

FIG. 8 shows a second seal for use in accordance with another embodiment of the present invention.

DETAILED DESCRIPTION

Figure 1:
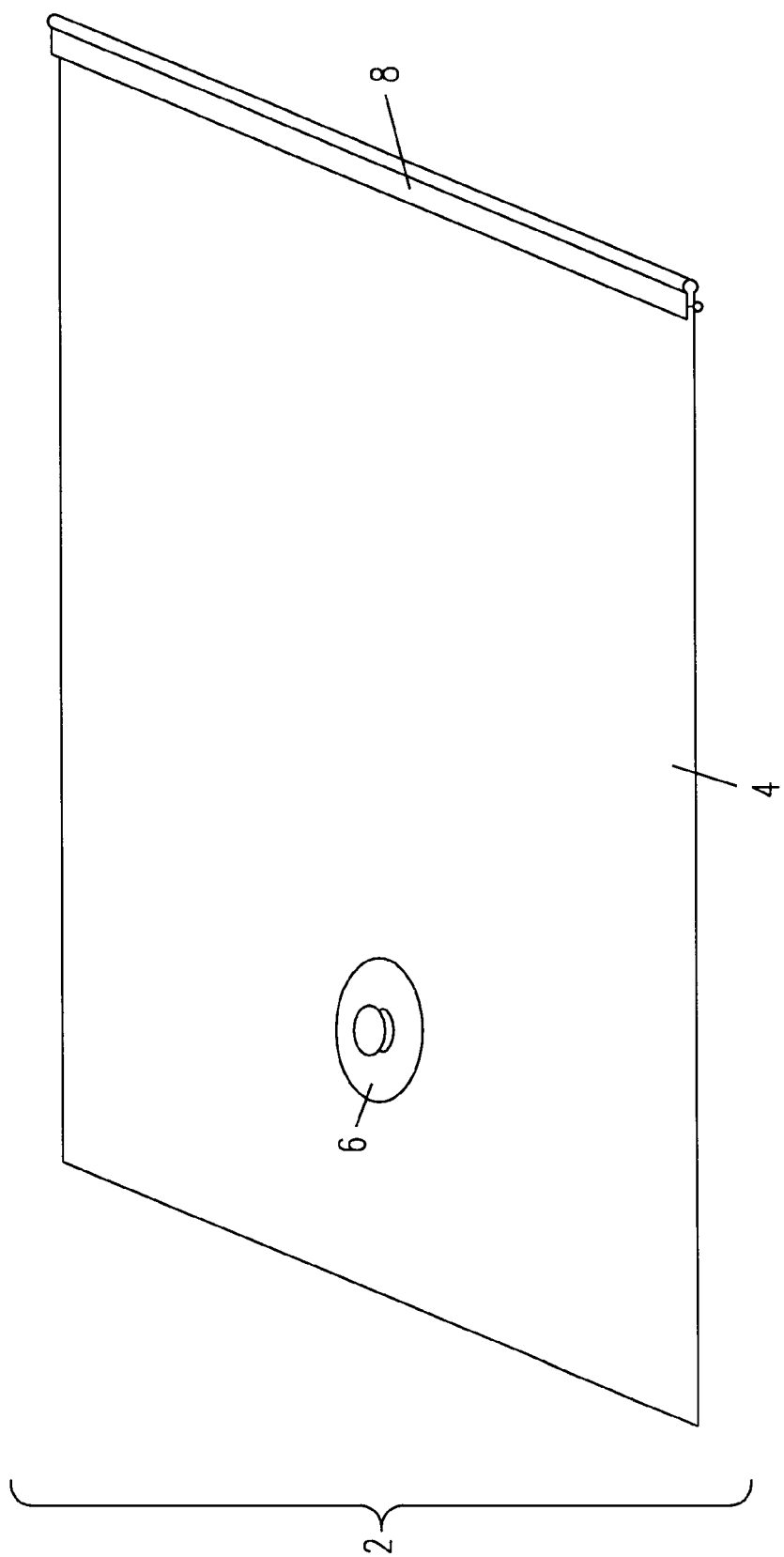
FIG. 1 shows a vacuum enclosure in accordance with the present invention.

FIG. 1 shows a vacuum enclosure 2 in accordance with the present invention. Vacuum enclosure 2 includes a bag 4, a valve assembly 6, and a seal 8. Compressible articles, such as linen or clothing, may be enclosed in bag 4 and sealed from the ambient environment via seal 8 and valve assembly 6. Excess air in bag 4 may then be evacuated through valve assembly 6 so as to compress the contents of bag 4.

Figure 2:
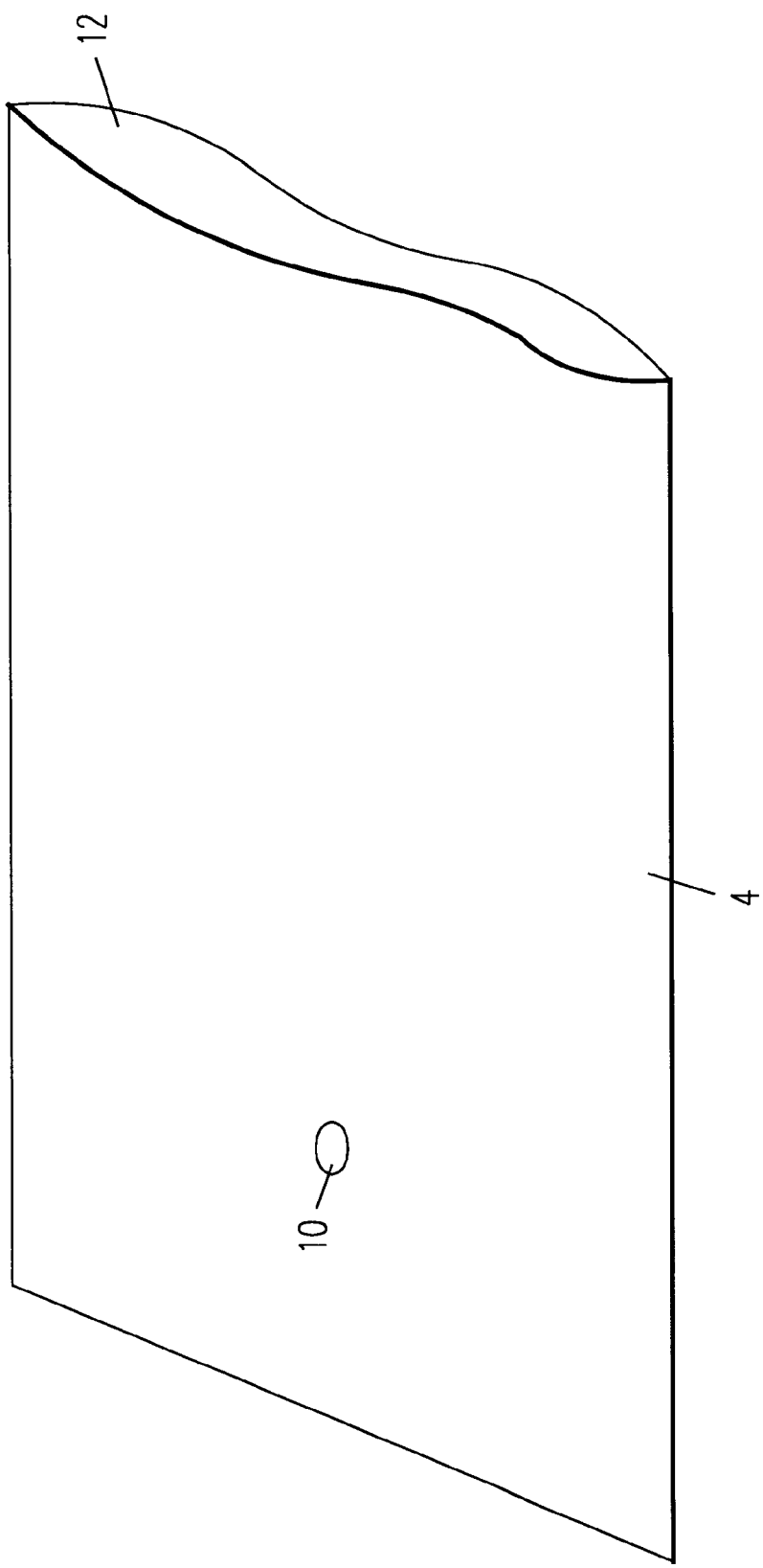
FIG. 2 shows a bag in accordance with the present invention.

Bag 4, as used in the present invention, is illustrated in FIG. 2. Bag 4 includes a hole 10 in which to install valve assembly 6, and an opening 12 through which articles may be placed for storage.

Because vacuum enclosure 2 is intended to remain evacuated for long periods of time, bag 4 must be made of a material that is impervious to air. Moreover, bag 4 must be flexible and durable so that it collapses easily around stored articles and may be used a number of times without degradation of its air-tight qualities. In one embodiment of the present invention, the material used is "Curlon," which is a flexible, formable material comprising a laminate of polyethylene and nylon, available from Curwood, Inc. In another embodiment, bag 4 is made of tri-extruded polyethylene. Of course, many other materials and combinations of materials may be used, as is well known to those skilled in the art.

Figure 3:
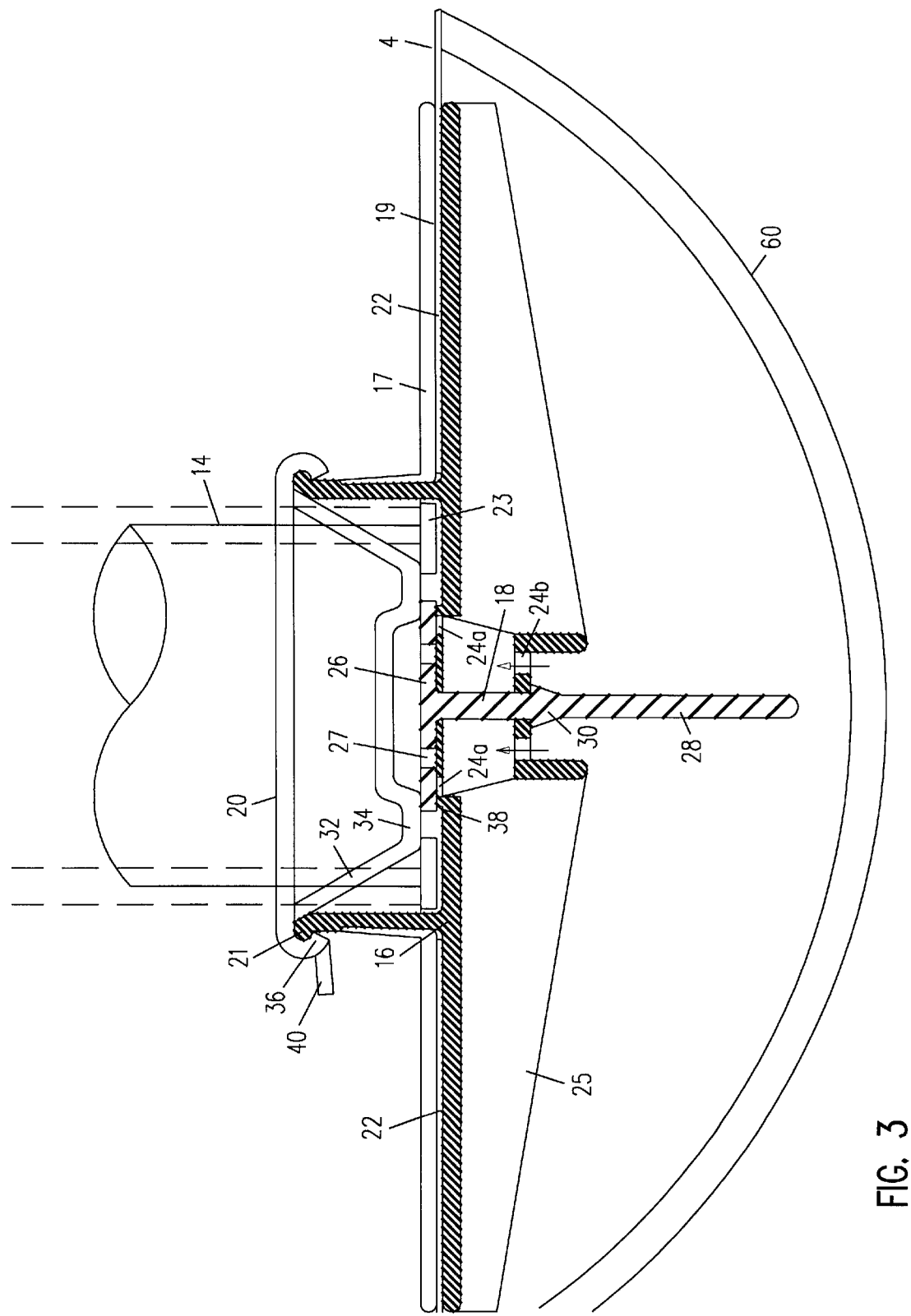
FIG. 3 shows a cross-section of a valve assembly coupled with a cylindrical vacuum attachment.

FIG. 3 shows a cross-section of valve assembly 6 and a cylindrical vacuum attachment 14. Valve assembly 6 includes a valve body 16, a valve body retaining ring 17, a valve 18, and a cap 20.

Valve body 16 is placed into bag 4 and through hole 10 so that a rim 21 protrudes through hole 10. A surface 22 of valve body 16 is then sealed to an area of bag 4 surrounding hole 10. Many methods are available to provide an air-tight bond between surface 22 and bag 4, including gluing and thermal bonding. In a preferred embodiment of the present invention, surface 22 is bonded to bag 4 by using thermal bonding to attach surface 22 to the material of bag 4. Superior results are obtained when the surfaces bonded are of similar material. In one embodiment of the present invention, the interior of bag 4 and surface 22 of valve body 16 are both polyethylene. Valve body retaining ring 17 is then snapped over the protruding portion of valve body 16, trapping bag 4 between surface 22 of valve body 16 and a surface 19 of valve body retaining ring 17.

Figure 4A:
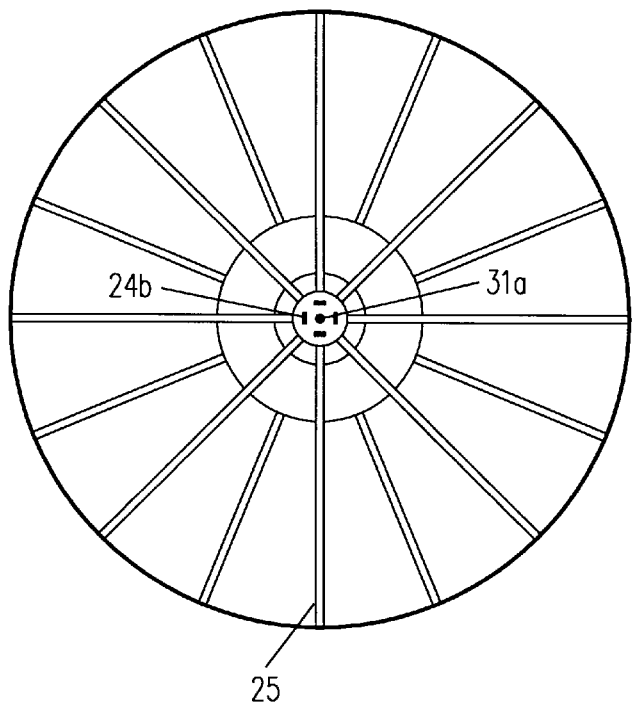
FIG. 4a is a bottom view of a valve body.
Figure 4B:
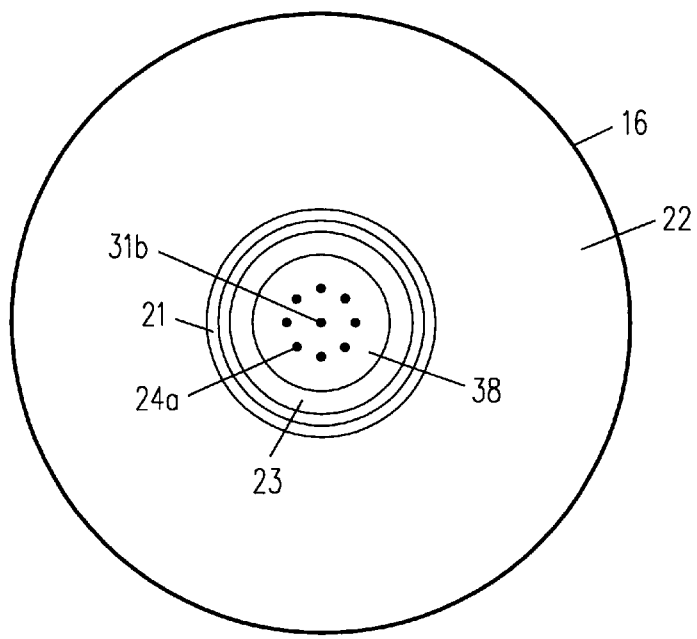
FIG. 4b is a top view of the valve body.

FIG. 4a is a bottom view of valve body 16; FIG. 4b is a top view of valve body 16. Air holes 24a and 24b are provided in valve body 16 to allow air to flow in the direction indicated by the arrows of FIG. 3, thus allowing air to be evacuated from the interior to the exterior of bag 4. As is shown in FIGS. 3 and 4a, valve body 16 is provided with vanes 25, which prevent the material or the contents of bag 4 from obstructing air holes 24b while air is being extracted.

Referring again to FIG. 3, a valve 18 is provided in valve body 16 to allow air to flow in the direction of the arrows, and to prevent air from flowing through air holes 24a in the direction opposite that indicated by the arrows. Valve 18 is made of an elastic material, such as silicone rubber, and includes a diaphragm 26, diaphragm slots 27, a stem 28, and a retainer 30. When assembling valve assembly 6, stem 28 is inserted into valve assembly 6 through holes 31a and 31b. Retainer 30, being elastic, compresses as stem 28 is pulled through hole 31a. Once through hole 31a, retainer 30 regains its shape, and thereby secures valve 18 in valve assembly 6.

Figure 5:
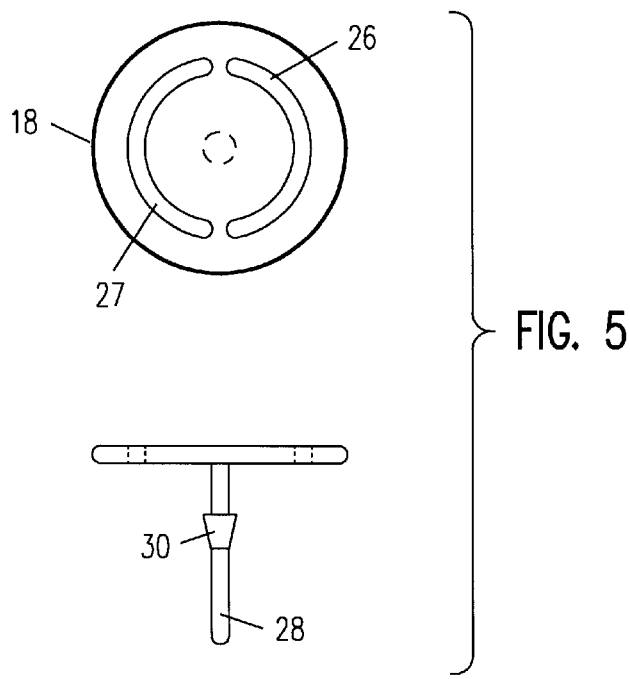
FIG. 5 shows a view of a valve showing a surface of a diaphragm.

FIG. 5 shows a view of valve 18 showing a surface of diaphragm 26. Diaphragm 26 is a flexible membrane that flexes to allow air to flow out of bag 4 through air holes 24a, but bars the passage of air into bag 4 through holes 24a. Diaphragm slots 27 reduce the rigidity of diaphragm 26, allowing diaphragm 26 to open freely. Slots 27 therefore reduce the restriction of air flow through valve 6 so that air may be easily extracted from bag 4.

As shown in FIGS. 3 and 4b, valve body 16 is equipped with an O-ring 23, which provides a seal between vacuum attachment 14 and valve body 16. As indicated by the dotted lines of FIG. 3, O-ring 23 is designed to provide a seal for a variety of cylindrical vacuum attachments, which typically range in diameter from approximately seven-eighths (⅞) of an inch to approximately one (1) inch in typical household vacuum cleaners. Moreover, tolerances are provided for O-ring 23 and valve body 16 so that vacuum attachments with small imperfections, such as chips and dents, may nevertheless achieve an adequate seal with valve body 16. Of course, valve body 16 may be designed to provide for other shapes and diameters of vacuum attachments.

Cap 20 is provided with a flexible protrusion 32 on its underside, which is in turn provided with a ring-shaped surface 34. When cap 20 is pressed into place, a lip 36 locks onto rim 21. Once cap 20 is snapped in place, flexible protrusion 32 is forced against diaphragm 26 so that diaphragm 26 is compressed between ring-shaped surface 34 and valve seat 38. The compression of diaphragm 26 provides an effective air-tight seal over air holes 24a, thus ensuring that air will not enter bag 4 when bag 4 is evacuated. In another embodiment of the present invention, protrusion 32 is replaced with a cylinder of dense foam that is sandwiched between cap 20 and diaphragm 26. A lip 40 on cap 20 provides leverage to ease removal of cap 20.

Figure 6:
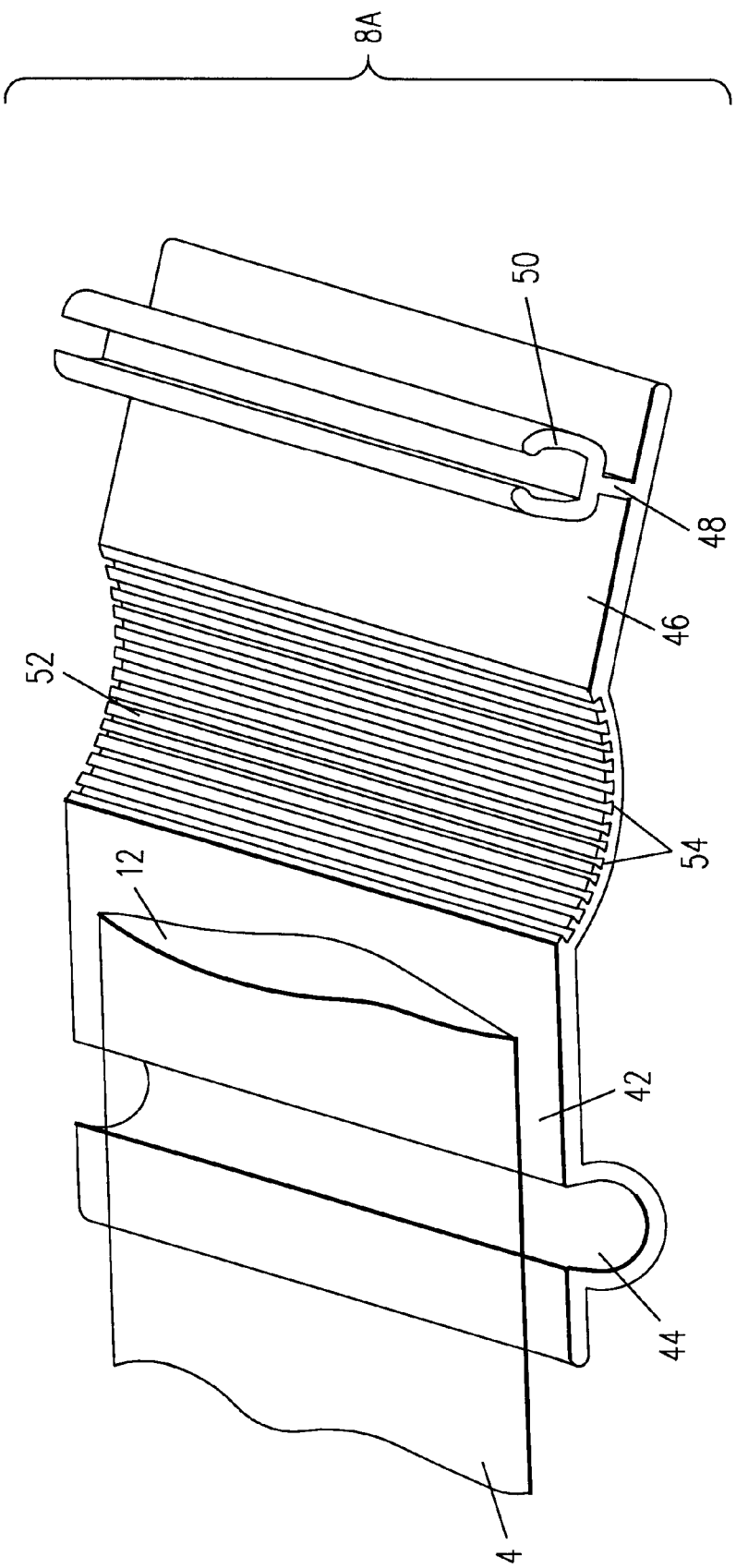
FIG. 6 shows a detailed view of a seal for pinching closed an opening of the bag.

FIG. 6 shows seal 8 for pinching opening 12 of bag 4 closed, and thereby providing an air-tight seal. Seal 8 is preferably an extrusion of acrylonitrile-butadiene-styrene copolymer (ABS) plastic, and is manufactured using techniques well known to those skilled in the art. Seal 8 includes a strip 42 having a slot 44 of C-shaped cross-section running the length of strip 42, a second strip 46 having a perpendicular ridge 48 running the length of strip 46 and a bifurcated flange 50 along the length of ridge 48, and a hinge 52 joining strips 42 and 46.

Figure 7:
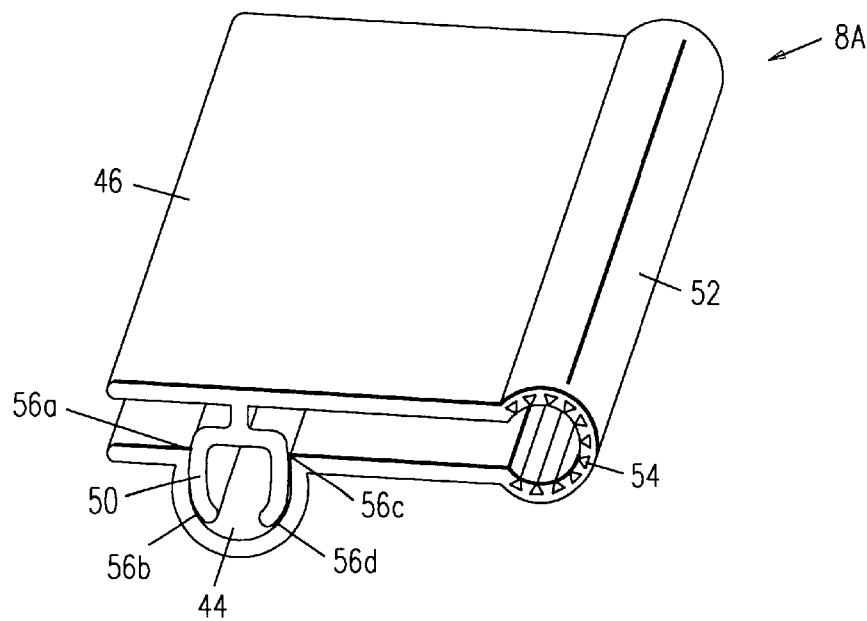
FIG. 7 shows the seal snapped closed.

Hinge 52 is of semi-circular cross-section. The inside surface of the semi-circular cross-section of hinge 52 includes a plurality of channels 54 running parallel to strips 42 and 48. Channels 54 each have a substantially triangular cross-section, such that each is widest at its bottom surface and narrowest at its top surface. As is shown in FIG. 7, this structure is beneficial because the surfaces between channels 54 meet when slot 44 and flange 50 are brought together. Thus, the surfaces between channels 54 limit the curvature of any particular portion of hinge 52, and thereby distribute the curvature and associated stress over the entire hinge. This stress distribution keeps hinge 52 from becoming fatigued along a particular line, and therefore allows the hinge to be flexed many times without breaking. Of course, the cross-sectional shape of channels 54 may be other than triangular. However, the triangular shape is preferred because the surfaces between channels 54, being relatively close together, serve to minimize the curvature of any particular portion of hinge 52, and thereby limit the amount of stress felt at any particular portion of hinge 52, while the relatively wide bottom surfaces of channels 54 serve to distribute stresses associated with the flexion of hinge 52 over a larger portion of hinge 52 than would narrower bottom surfaces.

To store and preserve an article in a vacuum storage container in accordance with the present invention, the user first places the article through opening 12 into bag 4. Next, as is illustrated in FIG. 6, bag 4 is laid across strip 42 so that bag 4 traverses slot 44. To ensure an effective seal along the length of opening 12, seal 8 should be long enough to extend slightly beyond the edges of bag 4. Seal 8 is then bent along hinge 52 so that flange 50 and slot 44 snap together, thereby pinching bag 4 between flange 50 and slot 44. Referring again to FIG. 7, flange 50 and slot 44, both being elastic members, exert pressure on bag 4 and thereby maintain an air-tight seal. Flange 50 and slot 44 are designed to pinch opening 12 closed across four distinct lines of compression. These lines are shown in the cross-section of FIG. 7 as points 56a, 56b, 56c, and 56d. The elasticity of slot 44 exerts pressure at points 56a and 56c, while the elasticity of flange 50 exerts pressure at points 56b and 56d. The use of multiple line of compression increases the integrity of the seal. In fact, it appears that the integrity of the seal increases (i.e., the seal becomes tighter) as a vacuum is applied to the inside of the bag.

FIG. 8 shows a second seal for use in accordance with another embodiment of the present invention. In this embodiment, opening 12 is sealed in substantially the same manner as in the previous embodiment, except that hinge 52 is eliminated. Instead, strips 42 and 46 are bonded, using techniques well known to those skilled in the art, to bag 4 along bond lines 56a and 56b. It is preferable that bond lines 56a and 56b do not extend along the entire length of opening 12, as such an arrangement may render bag 4 difficult or impossible to open without damaging bag 4. This embodiment has the advantage of providing an evacuable enclosure as a single unit.

Once the article is enclosed in bag 4 and opening 12 is sealed, excess air in bag 4 may be evacuated through valve assembly 6. The user first removes cap 20, using tab 40 to pry it open. The user then presses vacuum attachment 14 against O-ring 23. With vacuum attachment 14 thus sealed against valve body 16, a vacuum may be applied so that air is drawn through air holes 24a and 24b. After excess air has been extracted from bag 4, vacuum attachment 14 may be removed. Diaphragm 26 will seal air holes 24a, diaphragm 26 being pressed against valve seat 38 by the pressure differential between the outside and the inside of bag 4. To ensure the integrity of the valve seal, the user then replaces cap 20, and in so doing forces ring-shaped surface 34 to compress diaphragm 26 against valve seat 38. With the contents of bag 4 thus compressed and sealed from the surrounding environment, bag 4 and its contents may be more conveniently stored or shipped. Moreover, the growth of insects, mildew, and bacteria, which may damage the contents of bag 4, is inhibited.

Although the present invention has been described in considerable detail with reference to certain preferred versions thereof, other versions are possible. For example, different materials could be used for the various elements of the container, and different valve and cap structures could be used. Moreover, while the preferred embodiment of the present invention pinches opening 12 closed across four lines of compression, other embodiments could make use of a different number of lines of compression. Therefore, the spirit and scope of the appended claims should not be limited to the description of the preferred versions contained herein.

What is claimed is:

1. A one-way valve for use with a conventional vacuum cleaner attachment, said valve comprising:

a valve body containing an air passage;

a flexible diaphragm fixed to said valve body and covering said air passage, said diaphragm for allowing air to pass through said air passage in only one direction; and an annular member formed of a resilient material and fixed to said valve body, a distance between an inside diameter and an outside diameter of said annular member being selected such that an exposed flat surface of said annular member is capable of forming a seal with cylindrical vacuum cleaner attachments of various diameters when any one of said attachments is manually pressed against said member on a downstream side of said air passage, thereby permitting said vacuum cleaner to draw air through said air passage, said flat annular member surrounding said flexible diaphragm, said flexible diaphragm being sized and positioned such that said flexible diaphragm is capable of flexing so as to open and close said air passage when any one of said attachments is pressed against said member.

2. A one-way valve comprising:

a valve body containing an air passage;

a flexible diaphragm fixed to said valve body and covering said air passage, said diaphragm for allowing air to pass through said air passage in only one direction; and a flat annular member formed of a resilient material and fixed to said valve body, said annular member being adapted so as to form a seal with a cylindrical attachment of a vacuum cleaner when said attachment is manually pressed against said member on a downstream side of said air passage, thereby permitting said vacuum cleaner to draw air through said air passage; and a plurality of vanes on an upstream side of said valve body for preventing said air passage from being obstructed when air is being drawn through said air passage, said vanes comprising a plurality of finlike projections which are attached to and extend from said valve body, each of said finlike projections having an outer edge for contacting an object and thereby preventing said object from obstructing said air passage.

3. The valve of claim 1 wherein a top surface of said flexible diaphragm is substantially coplanar with a top surface of said annular member.

4. The valve of claim 1 wherein said flexible diaphragm is circular and concentric with said annular member.

5. The valve of claim 1 wherein said flexible diaphragm is fixed to said valve body at location adjacent a central portion of said diaphragm, said air passage comprising a plurality of holes in said valve body positioned around said location.

6. The valve of claim 2, wherein each of said vanes comprises a planar member which extends from a bottom surface of said valve body.

7. The valve of claim 6 wherein each of said vanes is perpendicular to said bottom surface.

8. The valve of claim 6 wherein said vanes are arranged in a radial pattern around said air passage, each of said vanes extending radially outward from said air passage.

* * * * *